C. A. WINN.
RACE FOR ROLLER BEARINGS.
APPLICATION FILED APR. 23, 1917.

1,263,011.

Patented Apr. 16, 1918.

Inventor
Charles A. Winn
By Brown, Hanson & Boettcher
Attorneys.

UNITED STATES PATENT OFFICE.

CHARLES A. WINN, OF CHICAGO, ILLINOIS, ASSIGNOR TO CHICAGO BEARINGS COMPANY, OF CHICAGO, ILLINOIS, A CORPORATION OF ILLINOIS.

RACE FOR ROLLER-BEARINGS.

1,263,011.  Specification of Letters Patent.  Patented Apr. 16, 1918.

Application filed April 23, 1917. Serial No. 163,769.

*To all whom it may concern:*

Be it known that I, CHARLES A. WINN, a citizen of the United States, residing at Chicago, in the county of Cook and State of Illinois, have invented a certain new and useful Improvement in Races for Roller-Bearings, of which the following is a full, clear, concise, and exact description, reference being had to the accompanying drawing, forming a part of this specification.

The present invention relates broadly to roller bearings and more particularly to the races employed therein, and has for its primary object the novel and improved construction of the roller races whereby to reduce the expenditure of time and labor consumed in grinding the races and to provide more accurate results than are obtainable in the present methods in general use.

I accomplish the foregoing by grinding the inner and outer surfaces of the race, in this instance the outer race, simultaneously, so that there is assured concentric alinement of the surfaces and a consequent saving in time and labor expended, enabling one to produce a less expensive and more accurately constructed article.

In grinding the races of roller bearings and the like, the general practice has been to first grind the inner surface by clamping the outer surface in a chuck and then removing the race from the chuck and placing the same on a mandrel while the outer surface thereof is ground. This involves extra labor as it requires two operations and it tends to a loss of accuracy as the two annular surfaces are not always concentric. However, my invention is an improvement not only from a manufacturing standpoint, but also when installing the race in tapered holes my invention eliminates grinding the race to a taper as will be pointed out more at length hereinafter.

I wish to emphasize that my invention is not limited in its application to the outer race or to any particular shape of race, conical or otherwise, but I claim as new the manner of grinding the two surfaces simultaneously by leaving unground a portion of the outer surface to be grasped by the chuck. It is preferable that the ground portion be locked in alinement with the rollers.

One form of roller bearing embodying the improvements of my invention is disclosed in the accompanying drawings, in which—

Figure 1:
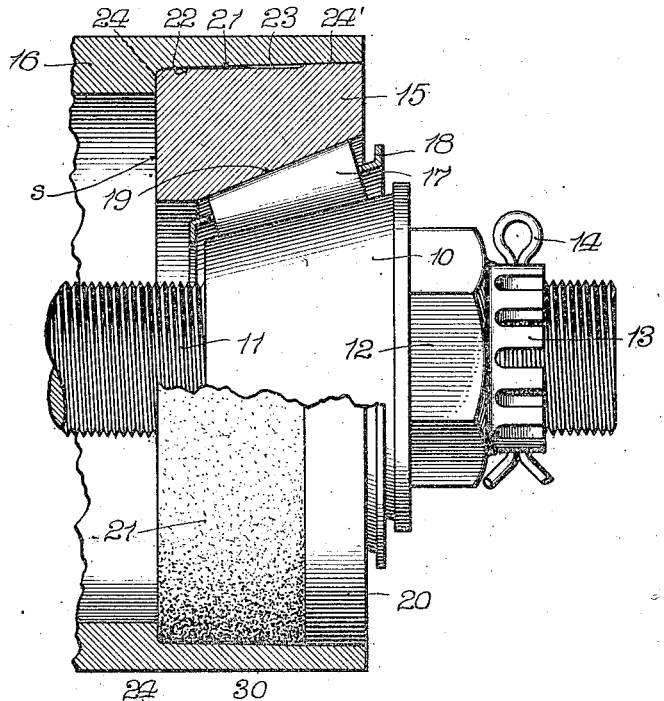
Figure 2:
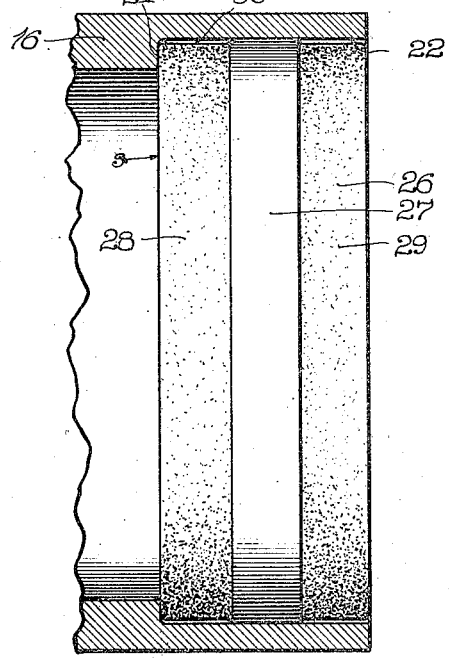

Figure 1 is a fragmental sectional view of the roller bearing, portions thereof being broken away to illustrate the rollers and their mounting; and Fig. 2 is a fragmental elevational view of a modified form of my invention.

Referring specifically to Fig. 1 wherein one embodiment of my invention is shown, I have illustrated the inner cone, the outer cone and a portion of a wheel hub. The inner cone is designated 10 and is mounted on a shaft or axle 11 in any suitable manner.

In order to make clear the application of the device, one well known form of fastening means is illustrated in the form of a nut 12 having a nut locking device comprising a recessed flange 13 and a cotter pin 14, which latter passes through the shaft or axle 11.

The outer race is designated 15 and the wheel hub 16. In the present instance a tapering inner race or cone is shown supporting a plurality of rollers, one of which is shown and designated 17, said rollers being withheld from displacement by means of a conventional type of retainer 18. The type of roller bearing shown in Fig. 1 of the drawing is usually employed in automobile wheels, although it is to be understood that this application is not intended to be limiting.

The foregoing features of construction, as described, do not form any essential part of my invention and may be substituted by other structural arrangements without materially affecting my invention.

It is often desired to install roller bearings on used cars or the like which have the sockets for the bearings formed with a taper on the inner end. I have shown such a socket in Fig. 1. In this case the hub 16 has an inner shoulder 24 against which the bearing abuts and for a slight distance outward a surface of the socket is tapered. The outer end of the socket is cylindrical. Under the general practice, prior to my invention it is necessary to taper the outer surface of the race and it is with this in mind that I have designed the race as shown in Fig. 1. With this end in view I grind the inner surface of the race designated 19 and a portion 20 of the outer surface, leaving the portion 21 of the outer surface unground and of slightly less diameter than that of the ground portion. Thus when the race is inserted into the hub having a tapering opening a portion of the outer surface of the race will be spaced from the inner surface of said opening as at 23. The inner end of the outer race 15 abuts a shoulder 24 formed interiorly of the hub 16 at the base or inner end of the tapered opening. The portion 20 of the outer surface of the outer race is adapted to snugly fit within the cylindrical portion of the socket and annularly engage the inner surface 22 thereof, as indicated at 24' in Fig. 1. Thus there will be three points of suspension or of support of the race when installed in a tapered opening, namely, engagement of the rear surface or end of the race with the shoulder 24, a partial surface engagement of the unground portion of the outer surface of the race with the inner surface of the tapered part of the socket and the engagement at 24' on the outer cylindrical ground surface 20 of said race. Thus the race may be as readily inserted into a tapered opening as into a cylindrical opening, grinding of the race to a taper being obviated.

When constructing the race the outer surface or end thereof is abutted against the inner ends of the chuck on a lathe and the surface of the race which is to be left unground is grasped in the jaws of the chuck. Although the inner surface 19 and the outer surface of the race may not be concentric originally these surfaces when ground without removal from the chuck will be as nearly concentric as grinding can make them and the outer surface will be at right angles to the surface s. Therefore the insertion of the race into a tapered opening will be as practicable as the insertion of the race into a cylindrical opening. When the race is installed in a tapered opening, the body of the same must be relatively thick so as to afford the necessary strength, particularly when tapering rollers and a tapered cone are employed.

In Fig. 2 a modification is shown and serves to illustrate the possibility of change in the position of the ground surface of the race. In this instance the race is designated 26, the ground surface thereof 27, and the unground portions 28 and 29. The race as shown in Fig. 2 is inserted in a cylindrical opening 30 in the hub 16. The grinding of the outer and inner surfaces of the race may be performed in the same manner as that set forth hereinbefore. The position of the ground surface is not material other than that it is desirable that the same be located as nearly as possible over the greatest line of stress through the race.

I desire to emphasize the fact that the principal advantage to be obtained from my invention is its adaptability, without grinding to a taper, to insertion into a tapered opening. Further the manner of manufacturing the race whereby concentric relation of the inner and outer surfaces thereof is assured, as well as an accurate right angular relation of the rear surfaces of the race to one or both of the other surfaces thereof. Therefore I am enabled to construct the race more rapidly and more accurately than is possible in the methods hereinbefore employed and am able to produce a race which is capable of a greater scope of utility.

The spacing of the rough surfaces of the two forms of my invention as shown from the inner surface of the hub has been exaggerated but it will be clearly understood that the variation in diameter between the roughened and ground surfaces of the outer race amount to only a few thousandths of an inch. The area of the ground surfaces and the position of the same is not material, except in the form of the invention shown in Fig. 1, wherein it is desirable that the ground surface be located as near the outer edge of the race as possible so as to facilitate insertion of the race. The location of the ground area in Fig. 2 depends upon the line of stress between the rollers and the bearing.

While I have shown and described my invention as embodying specific features of construction it is to be understood that I do not limit myself to such features but reserve the right to make such changes therein as do not depart from the spirit and scope of the invention as claimed.

I claim:

1. A bearing member having one face thereof ground to provide a race for roller bearings, a generally cylindrical bearing face having a peripheral cylindrical band ground concentric with the race, said cylindrical band being adapted to form a support for the bearing member, the remainder of the bearing face being cut back to relieve the peripheral cylindrical band.

2. A race for bearings having a ground bearing face, a support for the race and said race having a partly ground supporting surface for contact with the support, the running surface of the race being entirely ground.

3. A race for bearings having supporting and running annular surfaces, the supporting surface being only partly ground to afford an area of contact with a support member and to be grasped by a lathe chuck or the like to grind both of the surfaces without moving the race from the lathe.

4. In combination, a race having an inner ground surface and a partly ground outer surface, said surfaces being ground without removing the same from a chuck or the like, the unground portion of the outer surface serving as an area to be grasped by a chuck while grinding, and the ground portion being adapted to engage a support when in use.

5. An anti-friction bearing race having a ground running surface and a partly ground supporting surface, a support member having a surface for engagement with the partly ground portion of said supporting surface, whereby to facilitate engagement of said surfaces and alinement of the bearing race in the support.

6. In combination with a member having a tapered opening therein terminating in a shoulder, a race to fit into the opening having a partly ground outer face parallel to the axis of said race, and a rear face at right angles to the first said face to abut said shoulder, the race engaging the inner surface of the opening at three or more points to support the race concentrically in said opening.

7. In combination with a member having a tapered opening therein terminating in an annular shoulder, a race having its outer face parallel to the axis of the same, a part only of said outer face being ground, the unground part being of less diameter than the ground part so that the outer face of the race when inserted into the opening will engage the same at its outer and inner extremities in order that the race will accurately aline in the opening.

8. In combination, a member having a tapered opening provided with a shoulder, a race having an outer surface parallel to the axis of the race and opening and a surface at right angles to said axis, a portion of said outer surface being ground and of greater diameter than the unground portion thereof, so that when the race is inserted into the opening the rear face thereof will abut said shoulder and both the ground and unground portions of the outer surface of the race will engage the inner surface of the opening so as to concentrically mount the race in said opening and thereby obviate grinding the outer surface of the race to a taper.

In witness whereof, I hereunto subscribe my name this 23rd day of March, A. D. 1917.

CHARLES A. WINN.